US005455999A

United States Patent [19]

Weiss et al.

[11] Patent Number: 5,455,999
[45] Date of Patent: Oct. 10, 1995

[54] METHOD FOR MAKING ELECTROCHEMICAL DEVICE

[75] Inventors: Douglas J. Weiss, Plymouth, Minn.; Boone B. Owens, Wrightsvile Beach, N.C.

[73] Assignee: Medtronic, Inc., Minneapolis, Minn.

[21] Appl. No.: 382,549

[22] Filed: Feb. 2, 1995

Related U.S. Application Data

[62] Division of Ser. No. 208,776, Mar. 9, 1994, Pat. No. 5,419,977.

[51] Int. Cl.$^6$ .................................................. H01M 6/00
[52] U.S. Cl. .......................................... 29/623.1; 29/623.5
[58] Field of Search ............................. 29/623.1, 623.3, 29/623.5

[56] References Cited

U.S. PATENT DOCUMENTS

| | | | |
|---|---|---|---|
| 3,811,944 | 5/1974 | Liang et al. | 136/6 R |
| 3,904,435 | 9/1975 | Benderly | 136/90 |
| 4,007,122 | 2/1977 | Owens et al. | 252/62.2 |
| 4,047,289 | 9/1977 | Wolff | 29/623.5 X |
| 4,048,404 | 9/1977 | Bro | 429/199 |
| 4,118,860 | 10/1978 | Buckler et al. | 29/623.5 |
| 4,485,155 | 11/1984 | Holl et al. | 429/194 |
| 4,544,615 | 10/1985 | Sishikura et al. | 429/194 |
| 4,638,407 | 1/1987 | Landsgaard | 361/433 |
| 4,650,733 | 3/1987 | Cimino et al. | 429/153 |
| 4,658,498 | 4/1987 | Yamaura et al. | 29/623.1 |
| 4,700,122 | 10/1987 | Cimino et al. | 320/61 |
| 4,730,383 | 3/1988 | Balkanski | 29/623.5 |
| 4,748,542 | 5/1988 | Lundsgaard | 361/433 |
| 4,792,504 | 12/1988 | Schwab et al. | 429/192 |
| 4,822,701 | 4/1989 | Ballard et al. | 429/192 |
| 4,830,939 | 5/1989 | Lee et al. | 429/192 |
| 4,839,248 | 6/1989 | Magnussen, Jr. et al. | 429/49 |
| 4,849,311 | 7/1989 | Itoh et al. | 429/192 |
| 4,983,476 | 1/1991 | Slane et al. | 429/197 |
| 5,001,023 | 3/1991 | Cheshire et al. | 429/94 |
| 5,061,581 | 10/1991 | Narang et al. | 429/192 |
| 5,082,594 | 1/1992 | Tsuzuki et al. | 252/502 |
| 5,141,825 | 8/1992 | Jensen | 429/31 |
| 5,141,828 | 8/1992 | Bennion et al. | 29/623.5 |
| 5,187,032 | 2/1993 | Saski et al. | 429/192 |
| 5,188,768 | 2/1993 | Sotomura | 252/518 |
| 5,190,695 | 3/1993 | Sotomura | 252/500 |
| 5,194,342 | 3/1993 | Bito et al. | 429/191 |
| 5,204,608 | 4/1993 | Koenck | 320/2 |
| 5,330,856 | 7/1994 | Gonzalez | 29/623.5 X |

FOREIGN PATENT DOCUMENTS

| | | | |
|---|---|---|---|
| 2-39513 | 7/1988 | Japan | H01G 9/00 |

OTHER PUBLICATIONS

*New Solid–State Electric Double–Layer Capacitor Using Poly(vinyl alcohol)–based Polymer Solid Electrolyte*, by Takaki Kanbara et al., Journal of Power Sources, 36 (1991), pp. 87–93 (month not available).

*Room Temperature Polymer Electrolyte Batteries*, by K. M. Abraham, Fourth International Rechargeable Battery Seminar, Florida, Mar. 1991.

*Li+–Conductive Solid Polymer Electrolytes with Liquid–Like Conductivity*, by K. M. Abraham et al., J. Electrochem. Soc., vol. 137, No. 5, May 1990, pp. 1657–1658.

*Conductivity of Electrolytes for Rechargeable Lithium Batteries*, by J. T. Dudley et al., Journal of Power Sources, 35 (1991), pp. 59–82 (month not available).

*Primary Examiner*—Anthony Skapars
*Attorney, Agent, or Firm*—Daniel W. Latham; Harold R. Patton

[57] ABSTRACT

An electrochemical device for production of electrical energy including a case, a primary Faradaic component in the case comprising an active metal anode and a cathode material, an electrochemical capacitor component in the case comprising first and second layers of conductive carbon separated by an electrolyte layer, and means for operatively combining the capacitor component and the primary Faradaic component to charge the capacitor component from the Faradaic component and to maintain the capacitor component in a charged state.

5 Claims, 8 Drawing Sheets

METHOD FOR MAKING ELECTROCHEMICAL DEVICE

This is a divisional of U.S. application Ser. No. 08/208,776 filed on Mar. 9, 1994, now U.S. Pat. No. 5,419,977.

BACKGROUND OF THE INVENTION

This invention relates to electrochemical cells which store/electrical charge by their capacitance and by their Faradaic capacity.

Electrochemical capacitors fall into two broad categories; (1) double layer capacitors which rely solely on interfacial charge separation across the electrical double layer and (2) pseudocapacitors which have enhanced charge storage derived mainly from Faradale transfer parallel with the double layer. Both types of capacitors offer major increases in capacitance density and energy storage capability when compared with conventional dielectric capacitors. They have the potential for extremely low values of electrical leakage unsurpassed by any other capacitive energy storage device. Electrochemical capacitors bridge the energy and power gap between batteries and capacitors. At the same time, they can exhibit both the cycle life and the stability expected of passive components.

In double layer capacitors, the components of the double layer capacitance are in electrical series leading to the equation $$1/C_{Total}=1/C_H+1/C_D$$

where $C_H$ and $C_D$ are the Helmholtz and diffuse layer capacitances respectively. If $C_D$ is large, as for example at high electrolyte concentrations, then the effective capacitance of the interface is more nearly equal to the Helmholtz capacitance. Conversely, when $C_D$ is low, as it will be at low concentrations, then the total capacitance tends to this value. Since concentrated electrolytes are utilized in electrochemical capacitors in order to achieve minimum resistance or ESR, the original Helmholtz concept will generally yield the more accurate values of capacitance. Since the charge or discharge of the double layer involves only a dipole reorientation process, it is a very rapid electrode reaction. When, on the other hand, charge storage is dependent on a charge transfer process, the kinetics will tend to be slower, and can be governed by diffusion in instances where chemical species from the bulk of either the electrode or the electrolyte are involved. Charge cannot leak across the double layer except by a charge transfer process. As a result, electrical leakage in double layer capacitors is intrinsically absent.

Pseudocapacitance is in parallel with the components of true double layer capacitance and thus gives rise to the possibility of considerably enhanced charge storage. Electrical response of a pseudocapacitor can often closely resemble that of a conventional double layer capacitor over a wide range of potential between the cathodic and anodic limits of electrolyte decomposition. The apparent DC capacitance (really the true double layer capacitance plus the pseudocapacitance) can be derived from triangular sweep/voltage curves by the equation $$C=idt/dV$$

Also, the integral capacitance can be readily determined by means of constant current charging curves. The materials used in a pseudocapacitive couple include electrode materials which can be prepared in a stable, high surface area form and materials which can undergo reversible surface or near-surface charge transfer reactions at a relatively constant voltage. Certain of the conducting transition metal oxides, notably $RuO_2$, and $IrO_2$ have been found to fulfill these requirements. The clear advantage inherent in the use of a pseudocapacitive material for high rate, high energy density electrochemical capacitors is in the significantly higher capacitance densities achievable when compared with those for double layer capacitors.

The main design parameters to be considered in the selection of an electrochemical energy storage capacitor are voltage, capacitance density, ESR, leakage current, and energy density. Other significant parameters are the load and charge-back profiles, duty cycle and repetition rate. The electrical means of coupling the capacitor with the load must also be defined.

The energy stored in a capacitor is given by the simple formula $$\tfrac{1}{2}CV^2$$

while the basic equations relating voltage and time for the charge and discharge of a capacitor which in turn govern power output are $$V_t=V_o(1-e^{-t/RC}) \ (charge)$$

$$V_t=V_oe^{-t/RC} \ (discharge)$$

where R is the equivalent series resistance (ESR). Maximum current and power levels are achieved by devices possessing the lowest value of ESR and the highest voltages. For constant coulombs charged into a device, the energy stored is directly proportional to voltage as a consequence of the fact that the expression $\tfrac{1}{2}\ CV^2$ is equivalent to $\tfrac{1}{2}\ QV$.

Solid state electrochemical capacitors can be made by using solid state electrolytes in place of more conventional liquid electrolyte materials. The advantages sought in solid state capacitors include the elimination of electrolyte leakage, improved operation at high and low temperatures, elimination of the need for a discrete separator element, the ease of miniaturization, multiple shape factors and the possibility of simple reliable designs for bipolar electrode cell stacks to allow fabrication of high voltage devices. However, the major problem with solid electrolytes is that they have much higher electrical resistances than liquid electrolytes which results in relatively high values of ESR for solid state capacitors. Typically, the conductivity of liquid electrolytes exceeds that of solid electrolytes by several orders of magnitude. Such low conductivity means that although the capacitor may have the ability to store a great deal of energy per unit volume, the time to discharge the energy stored in the capacitor is quite long and may make the capacitor unsuitable for many electronic applications for which the stored energy must be supplied at high voltages in milliseconds rather than in seconds or minutes. Since high voltages require multi-layer designs with cells connected in series, even a very low ESR for a cell can amount to an unacceptable ESR for the entire device. One example of such an application is the implantable heart defibrillator where high voltages (e.g. 800 volts) and energy must be delivered from a capacitor within 5–15 milliseconds.

The conductivity issue has been addressed by the development of improved conductive polymeric electrolyte materials in both capacitors and batteries. For example, in U.S. Pat. Nos. 4,638,407 and 4,748,542 to Lundsgaard a polymer (e.g. polyethylene oxide), rendered ionically conductive by the addition of an inorganic salt (e.g. $LiClO_4$, $NaClO_4$, $LiCF_3SO_3$, or $LiBF_4$) was combined with activated carbon-containing electrodes to produce a multi-layer solid-state electrochemical capacitor. In U.S. Pat. No. 4,830,939 issued to Lee et al., a solid electrolyte for electrochemical cells is formed by mixing a liquid polymerizable compound, a radiation inert ionically conducting liquid and an ionizable alkali metal salt and subjecting them to polymerizing radiation. In Abraham et al., $Li^+$-*Conductive Solid Polymer Electrolytes with Liquid-Like Conductivity*, J. Electrochem. Soc., Vol 137, No. 5, May 1990, a polymer network of polyacrylonitrile, poly(tetraethylene glycol diacrylate) or poly(vinyl pyrrolidone) is disclosed to immobilize a liquid solvent such as ethylene carbonate or propylene carbonate and a lithium salt. In a paper by Abraham, *Room Temperature Polymer Electrolyte Batteries* Fourth International Rechargeable Battery Seminar, Florida (March 1992), additional polymer networks using poly(bis((methoxy ethoxy) ethoxy) phosphazene), polypropylene oxide, and polyethylene oxide are disclosed. In Kanbara et al., *New solid-state electric double-layer capacitor using polyvinyl alcohol-based polymer solid electrolyte*, Journal of Power Sources 36 (1991) 97-93, PVA was disclosed to dissolve large amounts of lithium salts to provide a solid-state electrolyte with good conductivity for double layer capacitors. In Morita et al, *Ethylene carbonate-based organic electrolytes for electric double layer capacitors*, Journal of Applied Electrochemistry v. 22 n. 10 p. 901–8 (1992) a stable discharge capacitance and a high columbic efficiency were obtained in a model capacitor using carbon fiber electrodes and an electrolyte of ethylene carbonate and gamma-butyrolactone dissolving $Et_4NPF_6$. In U.S. Pat. No. 4,792,504 issued to Schwab et al., a solid polymer electrolyte is disclosed with a continuous network of polyethylene oxide containing a dipolar aprotic solvent and a metal salt.

Another component of electrochemical capacitors that has received attention is the electrode. Carbon electrodes have been studied extensively. Carbon black has the drawback of high resistivity arising out of poor particle-to-particle contact. However, since the energy density of the capacitor is directly proportional to accessible surface area of electrode materials and since carbon black is known as an electrode material which can have surface areas in the range of 1000–2000 $m^2$/g, it is still highly desirable for electrochemical capacitor applications. An alternative to carbon black is the use of carbon aerogel foams as set forth in Mayer et al *The aerocapacitor: an electrochemical double-layer energy-storage device*, Journal of the Electrochemical Society v. 140 n. 2 p.446–51 (1993). The conductivity of solid state electrochemical capacitor electrodes can also be enhanced by adding to the carbon a sulfuric acid aqueous solution such as that used in double layer capacitors sold under the tradename SUPERCAP by Nippon Electric Company (NEC). Conductivity can also be improved by including in the carbon electrode an ionically conducting polymer (e.g. polyethylene oxide) and an inorganic salt as set forth in U.S. Pat. Nos. 4,638,407 and 4,748,542 to Lundsgaard. Also, in Japanese Kokai Patent Application No. HEI 2[1990]-39513, carbon is impregnated with a polymeric solid electrolyte made with a solid solution of a polyether polymer and an alkali metal salt. However, carbon electrodes using these solid electrolytes still lack the conductivity needed for many double layer capacitor applications.

In addition to capacitors and pseudocapacitors, there are many applications in which a primary Faradaic electrochemical cell or a battery consisting of a combination of Faradale cells is used as a source of energy that is called upon periodically or discontinuously for energy pulses. In many such applications, the primary Faradaic cell may have a power capacity that is relatively small so that charge storage devices are used in the circuity of the device to supply current upon demand in amounts that would otherwise not be within the capability of the Faradaic cell. For example, in an implantable cardiac defibrillator even a relatively high discharge rate lithium cell is unable to provide the energy needed for a defibrillation pulse. However, the lithium cell can be used to charge a capacitor over 8–10 seconds and then the capacitor discharges the stored energy in a defibrillation pulse lasting 5–15 milliseconds. In an improvement on the concept of battery/capacitor combinations for pulsed energy output, U.S. Pat. No. 3,811,944 issued to Liang et al. discloses an electric cell or battery that is electrically combined with a capacitor in a common case so that the capacitor serves as a buffer for the cell or battery. At the first connection of the capacitor with the cell, the capacitor is charged to full cell voltage and remains so until called upon to supply pulsed energy to the application. However, the current leakage in the disclosed electrolytic capacitor could tend to reduce the life of a primary Faradaic cell as the cell is in storage or as the cell remains in the application device awaiting demands for current.

It is therefore an object of the present invention to provide an electrochemical cell in which a primary Faradaic component is supplemented by a charge storage component in the same device for use in pulsed discharge applications.

It is also an object of the present invention to provide an electrochemical cell combining a primary Faradaic component with a charge storage component and having a long useful life.

SUMMARY OF THE INVENTION

These and other objects are accomplished by the present invention. We have discovered a hybrid device which includes a primary Faradaic component electrically combined with a double layer charge storage component. The electrochemical device according to the invention comprises a case, a primary Faradaic component in the case comprising an active metal anode and a cathode material, an electrochemical capacitor component in the case comprising first and second layers of conductive carbon separated by an electrolyte layer, and means for operatively combining the capacitor component and the primary Faradaic component to charge the capacitor component from the Faradaic component and to maintain the capacitor component in a charged state.

For example, in one embodiment of the invention, the primary Faradaic component is operatively combined with the capacitor component by contacting a layer containing the active metal anode with the first layer of conductive carbon and contacting a layer containing the cathode material with the second layer of conductive carbon. Thus, a cell combining Faradale and capacitive properties can be provided by placing a polymeric electrolyte between an anode comprising an active metal, conductive carbon and an electrolyte and a cathode comprising a reactive cathode material, conductive carbon and an electrolyte. The anode can be constructed either by maintaining separate layers of active metal and conductive carbon or by combining the active metal, conductive carbon and electrolyte in a single layer. For example, a sheet of lithium metal contacts a composite electrode which includes carbon and an electrolyte and the composite electrode then contacts the polymeric electrolyte. Or, for example, lithium metal in particulate form can be admixed with conductive carbon and an electrolyte in a single layer. Likewise, the cathode can be constructed by maintaining separate layers of the reactive cathode material and the conductive carbon electrode or by combining the cathode material and conductive carbon in a single layer. In operation, such cells employ their primary Faradaic capacity to maintain an internal double layer charge at the voltage dictated by the chemistry of the Faradaic cell that may be discharged as required by the application.

In a second embodiment of the invention, the primary Faradaic component is operatively combined with the capacitor component by combining a active metal anode in powder form with the conductive carbon in the first conductive carbon layer and by combining the cathode material with the conductive carbon in the second conductive carbon layer.

Such devices can be provided with high voltage capabilities by providing a plurality of stacked cell layers. Construction of such devices can be accomplished by making very thin component layers including sequentially, for example, a current collector, an anode comprised of particulate lithium, conductive carbon and an electrolyte in contact with the current collector, a polymeric electrolyte in contact with the anode, a cathode comprised of manganese dioxide, conductive carbon and an electrolyte in contact with the polymeric electrolyte. These thin components can be series stacked so that each current collector serves to separate adjacent cells.

In yet other embodiments of the invention, low voltage stacked devices could also be made according to the present invention by stacking the primary Faradaic, ionic and capacitive components as set forth above in the unit cells and connecting the cells in parallel, or by winding the primary Faradaic, ionic and capacitive components together in a standard "jelly-roll" or spiral wrap configuration.

DETAILED DESCRIPTION OF THE INVENTION

Figure 1:
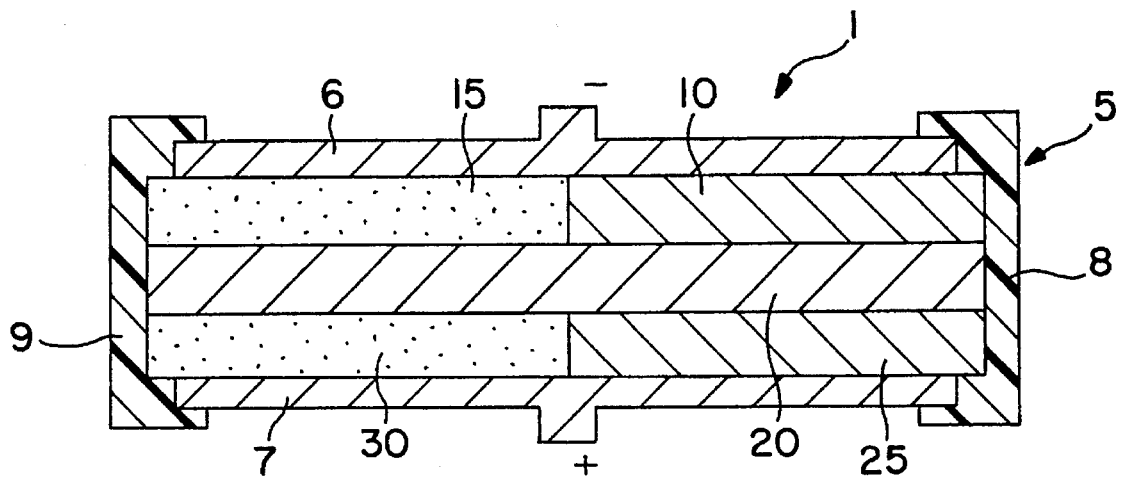
FIG. 1 is a cross sectional view of a first embodiment of a single cell electrochemical battery/capacitor made according to the present invention.

An electrochemical device for production of electrical energy is provided according to the present invention. The device may have the same appearance and use as an ordinary battery in that it may have a case of metal or polymeric material of conventional construction that is compatible with the chemistry of the device. Preferably, for implantable medical devices, the case is metal and is hermetically sealed to prevent interactions between chemical constituents of the device and electrical components of the medical device. The shape of the case can also vary according to that desired for the application or according to that preferred for economical manufacturing. Thus, for many implantable medical devices, a prismatic cell with substantially straight sides may be desired to produce the most compact packaging for the overall medical device, while a cylindrical cell made by winding the components may be acceptable for other applications and may be desired for economy of manufacturing.

Inside the case are a primary Faradaic component and a capacitor component. The primary Faradaic component is in the case comprising an active metal anode and a cathode material which may react in substantially the same manner as a conventional primary battery. The active metal anode includes a metal selected from Group IA of the Periodic Table of the Elements, including lithium, sodium, potassium, etc and their alloys, intermetallic compounds and carbon-metal ion insertion negative compounds. The active metal may consist of a thin sheet or foil of the metal or it may be metal in fiber, foam, particulate or powder form. An anode current collector of a conductive metal can be employed to connect the anode metal with a terminal of the device. The cathode material can be any positive electrode material and includes solid chalcogenide and solid oxide materials such as manganese dioxide, silver vanadium oxide, vanadium pentoxide and the like. It can be combined into a cathode with conventional binding agents such as PTFE, conductivity enhancers such as conductive carbon and other cathode components known in the art. A cathode current collector is typically employed to connect the cathode material with a terminal of the device.

The capacitor component employed in the present invention is an electrochemical capacitor component comprising first and second electrode layers comprising conductive carbon separated by an electrolyte layer. The electrodes preferably comprise at least 5 wt % (preferably at least 10 wt %) of an electrically conductive carbon having a surface area greater than 200 $m^2/g$ (preferably greater than 500 $m^2/g$), a soluble salt, a non-aqueous liquid solvent, and a gel-former. The types of carbon that may be employed include carbon foam (aerocarbons), carbon black, active carbons and carbon fibers. Carbon blacks are carbons typically produced from the thermal decomposition or partial oxidation of various hydrocarbons. Carbon black can include acetylene black which has been widely used in battery electrode compositions. Aerocarbons are carbon foams such as those disclosed in Mayer et al *The aerocapacitor: an electrochemical double-layer energy-storage device*, Journal of the Electrochemical Society v. 140 n. 2 p.446–51 (1993) which is incorporated herein by reference. Active carbons are carbons typically produced from materials such as coconut shells or petroleum coke by thermal decomposition in the presence of steam. Carbon fiber is a carbon typically made from thermal oxidation and pyrolysis of materials such as polyacrylonitrile and rayon. The electrically conductive carbon can be, for example, activated carbon, carbon black, carbon fibers or mixtures of activated carbon, carbon black and carbon fibers. For example, some carbons store more energy because they have higher surface area but they may not have the highest conductivity. Other carbons (e.g. continuous foams) may have a morphology that facilitates high discharge but may only store a limited amount of energy. By combining two or more carbons, such as carbon black and activated carbon, the properties of the electrode may be optimized. Preferably, carbon is loaded into the electrode at a wt % above 5% and most preferably in the 10–30% range although the most desirable carbon content will depend on the type of carbon, the type of soluble salt used and the type of liquid solvent used.

The soluble salt used in the electrodes can be any such salt which is soluble in the solvent employed in the electrodes to impart ionic conductivity to the electrodes. For example, alkali metal salts such as the lithium salts $LiClO_4$, $LiAsF_6$, $LiPF_6$, $LiCF_3SO_3$, $LiN(CF_3SO_2)_2$ or $LiBF_4$, and similar salts of sodium, potassium or magnesium could be used. Further, alkaline earth salts, and organic substituted ammonium cation salts (e.g. $(C_2H_5)_4NBF_4$) or other organic substituted phosphonium and sulfonium salts could be used. The amount of soluble salt used in the electrode composition can vary widely depending on the specific salt used. However, an amount in the range of about 5 wt % to 20 wt % could generally be used.

The non-aqueous liquid solvent used in the electrodes can be an aprotic organic solvent which is a liquid at the temperature at which the electrochemical capacitor will be used. This can include, for example, the solvents listed in Dudley et al., *Conductivity of electrolytes for rechargeable lithium batteries,* Journal of Power Sources, 35 (1991) 59–82, which is incorporated herein by reference. Thus, ethylene carbonate (EC), propylene carbonate (PC), 2-methyl tetrahydrofuran (2MeTHF), sulfolane, triglyme and mixtures thereof such as EC/PC, 2MeTHF/EC/PC or sulfolane/triglyme could be used. Preferably, the solvent is either ethylene carbonate or propylene carbonate and, most preferably, the electrolyte is a liquid mixture of ethylene carbonate and propylene carbonate. The amount of solvent used in the electrode is preferably enough to just wet the other electrode components and allow them to be formed into the desired shape. Preferably, a portion of the soluble salt is first dissolved in the solvent and then the salt/solvent is combined with the conductive carbon to provide an intimate mixture of salt, solvent and carbon. Following forming of the electrode, excess solvent may be removed, for example, by contacting the electrode with materials which absorb the excess solvent.

The gel-former used to make the electrodes is a material capable of providing the electrodes with a formable, cohesive network which immobilizes the carbon, salt and solvent. Preferably, it makes an electrode composition that is a rubbery solid at room temperature with only a relatively small amount of gel-former material in the composition. A polymer gel-former can be crosslinked after forming if additional structural strength is required. The gel-former used in the present invention is therefore preferably an acrylonitrile-based polymer although other polymers such as those found in Abraham, $Li^+$-*Conductive Solid Polymer Electrolyteswith Liquid-Like Conductivity,* J. Electrochem. Soc., V. 137, N. 5, p. 1657 May 1990 could also be used. Therefore polymers such as polyvinylpyrrolidone (PVP), polyvinylchloride, poly[(tetraethylene glycol) diacrylate] (PEGDA) and mixtures of such polymers could be used as well as mixtures of such polymers with polyacrylonitrile. To make electrodes with high amounts of carbon, the ingredients are preferably mixed from certain premixed components. First, the solvent is premixed into a stock solution which includes the solvent and dissolved salt. A portion of this liquid electrolyte stock solution is then premixed with the electrically conductive carbon in order to allow it to mix well with the other components of the electrode mixture. Preferably, the amount of stock solution added to the carbon is just enough to wet the carbon. A portion of the liquid electrolyte stock solution is also combined with the gel-forming polymer to provide a gelled electrolyte composition. The gelled electrolyte composition is then added to the carbon premix and thoroughly mixed to provide the electrode composition of the present invention. Preferably, the components are heated during the mixing step to make it easier to provide a uniform mixture. Also, preferably, the final mixture should be degassed in a vacuum to remove entrapped gases and volatile impurities. The resulting mixture can then be formed into a film by coating, casting or pressing methods. In a preferred method, the mixture is heated until it is flowable, and is then pressed between heated plates to provide an electrode of the desired thickness. Alternatively, one could press the electrode composition between polymer films or sheets which could then provide a support for the formed electrode material during subsequent transport, cutting or slitting operations. The electrode material could also be used in a process to provide a continuous film of very thin electrode material by extrusion of the material between rollers and onto a support web. A conductive current collector can also be pressed onto the film to make a completed electrode structure suitable for use in electrochemical devices such as electrochemical capacitors. The electrode composition could also be diluted and prepared as solutions which can then be formed into thick or thin films by conventional techniques such as doctor blade casting, hot pressing, solvent casting, dip coating, spin coating, extrusion or silk screening.

Figure 2:
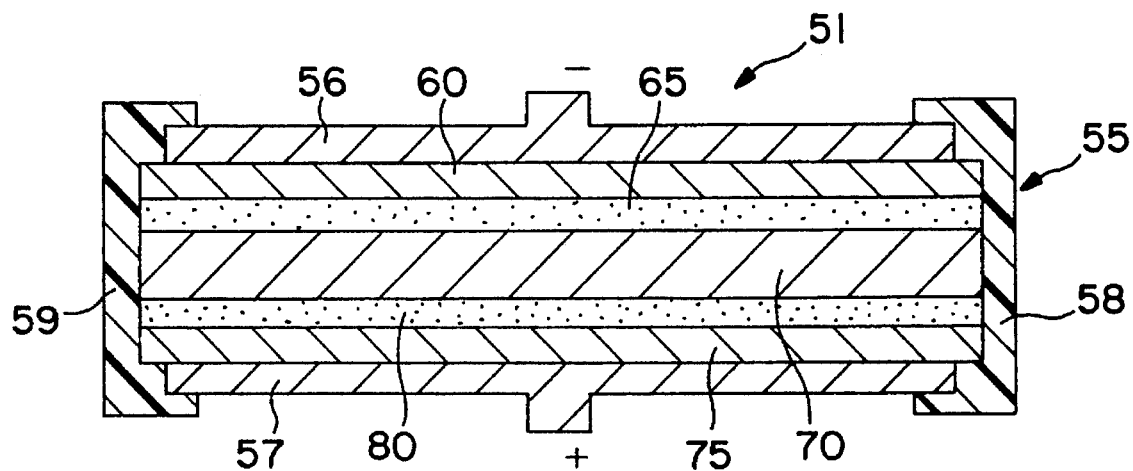
FIG. 2 is a cross sectional view of a second embodiment of a single cell electrochemical battery/capacitor made according to the present invention.

In the present invention, the capacitor component and the primary Faradaic component are operatively combined to charge the capacitor component from the Faradaic component and to maintain the capacitor component in a charged state. This can be accomplished by a variety of methods. For example, the primary Faradaic component can be combined with the capacitor component by contacting a layer containing the active metal anode with a first layer of conductive carbon and contacting a layer containing the cathode material with a second layer of conductive carbon. One example of such a device is shown in FIG. 1. FIG. 1 shows in cross section a hybrid battery/capacitor device 1 according to the present invention which has a case 5 which includes terminal plates 6 and 7 made from conductive material and end plates 8 and 9 made from insulative material. An active metal anode layer 10 of the primary Faradaic component and a carbon electrode 15 of the capacitor component are in contact with the polymeric electrolyte layer 20 and in contact with each other. A cathode layer 25 of the primary Faradaic component and a carbon electrode 30 of the capacitor component are in contact with the polymeric electrolyte layer 20 and in contact with each other. In operation, the primary Faradaic component including anode layer 10 and cathode layer 20 react to charge capacitor component electrodes 15 and 30 in the respective double layers. The terminal plates 6 and 7 act as current collectors for the anode and cathode elements of both the primary Faradale component and the electrodes of the capacitor component. The charge is then maintained in the device 1 until the device 1 is discharged. Another example of such a device is shown in FIG. 2. FIG. 2 shows in cross section a hybrid battery/capacitor device 51 according to the present invention which has a case 55 which includes terminal plates 56 and 57 made from conductive material and end plates 58 and 59 made from insulative material. An active metal anode layer 60 of the primary Faradaic component is in contact on one side with one terminal plate 56 and on a second side with a carbon electrode 65 of the capacitor component. The carbon electrode 65 is also in contact with the polymeric electrolyte layer 70. A cathode layer 75 of the primary Faradaic component is in contact on one side with the second terminal plate 57 and on the other side with a carbon electrode 80 of the capacitor component. The carbon electrode 80 is also in contact with the polymeric electrolyte layer 70. In operation, the primary Faradaic component including anode layer 60 and cathode layer 70 react to charge capacitor component electrodes 65 and 80 in the double layer.

Figure 3:
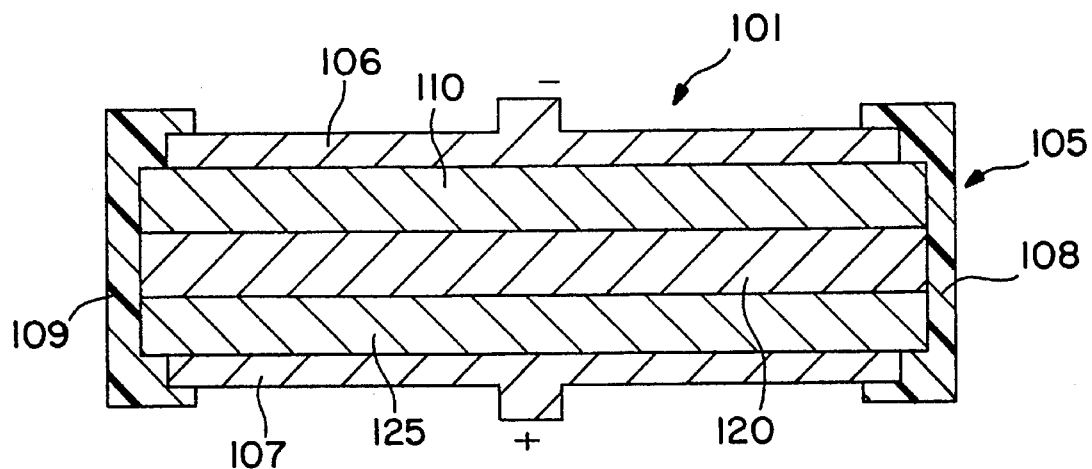
FIG. 3 is a cross sectional view of a third embodiment of a single cell electrochemical battery/capacitor made according to the present invention.

In another embodiment, the primary Faradaic component is operatively combined with the capacitor component by combining an active metal anode in powder form with the conductive carbon in the first conductive carbon layer and by combining the cathode material with the conductive carbon in the second conductive carbon layer. An example of such an embodiment is shown in FIG. 3. FIG. 3 shows in cross section a hybrid battery/capacitor device 101 according to the present invention which has a case 105 which includes terminal plates 106 and 107 made from conductive material and end plates 108 and 109 made from insulative material. An active metal anode layer 110 includes both the primary Faradaic (negative) component and the capacitor component. The active metal can be in powder or particulate form admixed with conductive carbon and an electrolyte. The anode is in contact on one side with one terminal plate 106 and on a second side with the polymeric electrolyte layer 120. A cathode layer 125 includes both the primary Faradaic (positive) component and the capacitor component. The cathode material is admixed with the conductive carbon and electrolyte. The cathode layer 125 is in contact on one side with the second terminal plate 107 and on the other side with the polymeric electrolyte layer 120. In operation, the primary Faradaic component in anode layer 110 and cathode layer 120 react to charge the capacitor component of those layers. Terminal plates 106 and 107 act as anode current collector and cathode current collector respectively.

Figure 4:
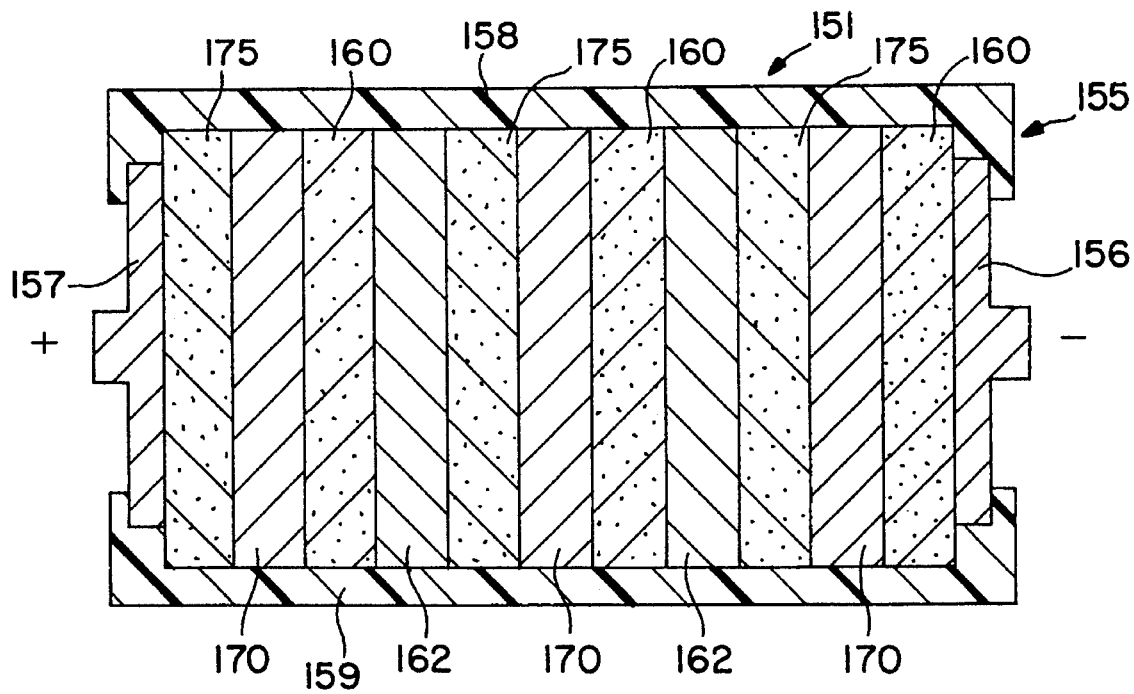
FIG. 4 is a cross sectional view of a first embodiment of a stacked, multi-layer electrochemical battery/capacitor made according to the present invention.
Figure 5:
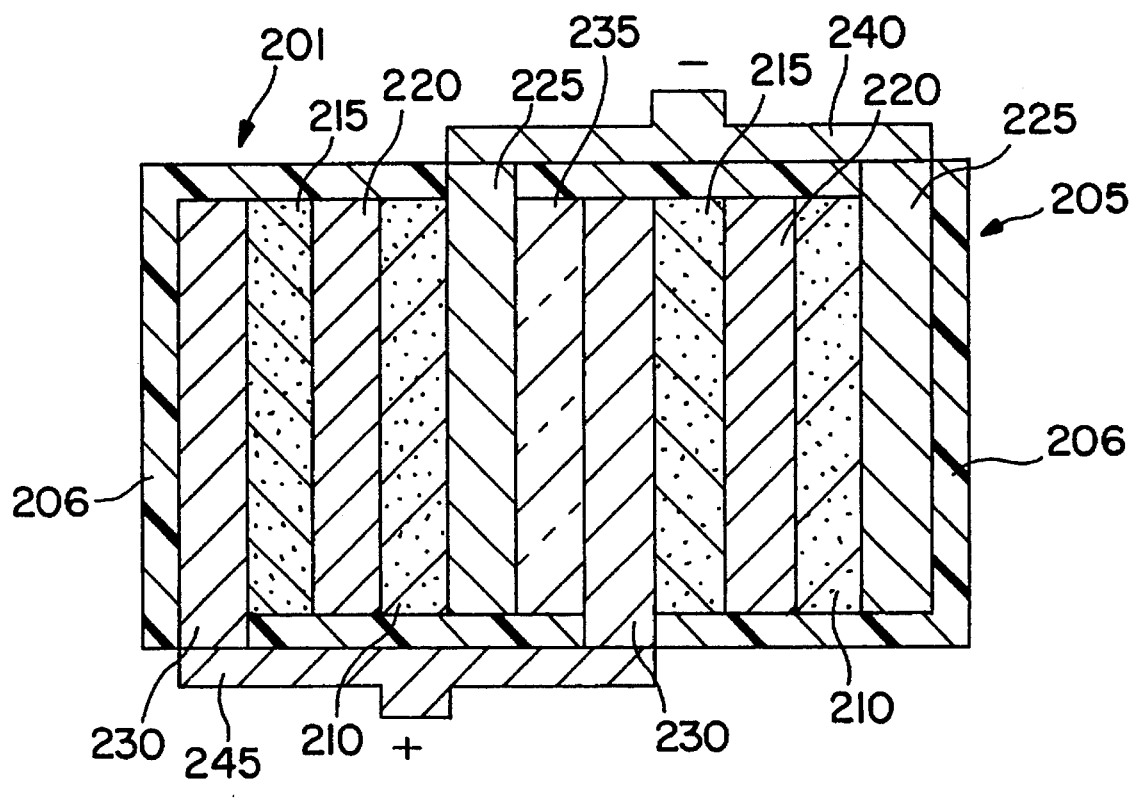
FIG. 5 is a cross sectional view of a second embodiment of a stacked, multi-layer electrochemical battery/capacitor made according to the present invention.

In yet another embodiment, the elements described above can be stacked to provide a high voltage capacitor where individual cells are connected in series. For example, in FIG. 4 a high voltage device is shown to be made from a series of cells similar to those disclosed in FIG. 3. FIG. 4 shows in cross section a high voltage hybrid battery/capacitor device 151 according to the present invention which has a case 155 which includes terminal plates 156 and 157 made from conductive material and plates 158 and 159 made from insulative material. The active metal anode layers 160 include both the primary Faradaic (negative) component and the capacitor component. The active metal can be in powder or particulate form admixed with conductive carbon and an electrolyte. The anode layers 160 are in contact on one side with either a terminal plate 156 or a current collector layer 162 and on a second side with a polymeric electrolyte layer 170. A cathode layer 175 includes both the primary Faradale component and the capacitor component. The cathode material is admixed with the conductive carbon and electrolyte. The cathode layer 175 is in contact on one side with either the second terminal plate 157 or a current collector 162 and on the other side with a polymeric electrolyte layer 170. Since the cells are connected in series, the current collector 162 serves as current collector for an anode in one cell and a cathode in an adjacent cell. In operation, the primary Faradaic component including anode layers 160 and cathode layers 175 in each cell react to charge the capacitor component of those layers and to store charge for the device 151. A stacked device can also be made which has low voltage charge storage which is increased by interconnecting cells in parallel. An example of such a device is shown in FIG. 5. FIG. 5 shows a cross section of a device 201 with a case 205 which includes perimeter walls 206 of insulative material. The cells are substantially as described in the example of FIG. 3 including an anode layer 210 which includes both the primary Faradale component and the capacitor component from the combination of particulate active metal anode, conductive carbon and electrolyte. Likewise, the cathode layer 215 of each cell includes cathode material, conductive carbon and electrolyte. A polymeric electrolyte layer 220 is between each anode layer 210 and cathode layer 215. Each anode layer 210 is in contact with an anode current collector 225 and each cathode layer 215 is in contact with a cathode current collector 230. Anode current collectors 225 are separated from cathode current collectors 230 in the stack by an insulating layer 235. The anode current collectors 225 are commonly connected to the negative terminal 240 and the cathode current collectors are commonly connected to the positive terminal 245.

Figure 6:
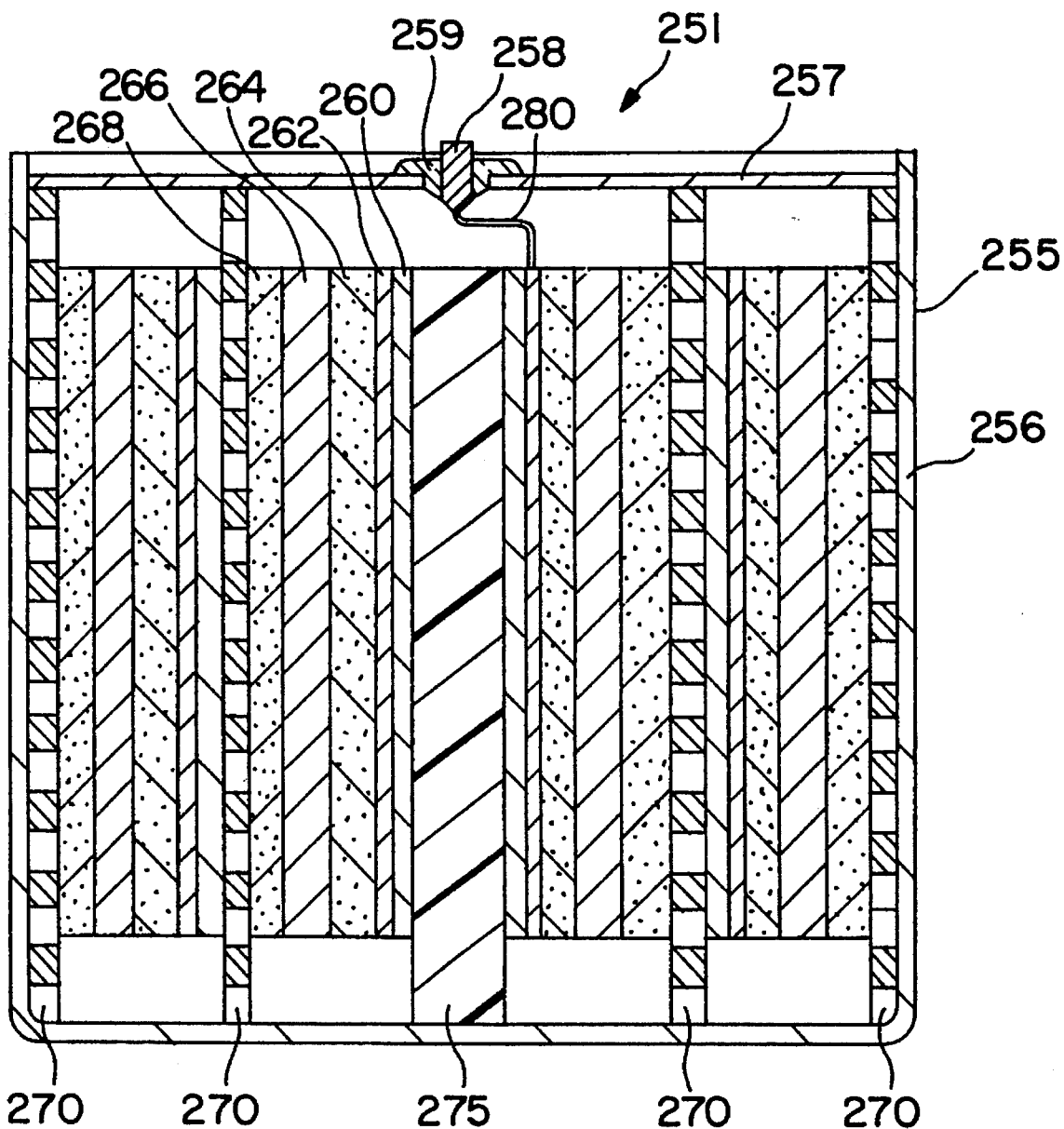
FIG. 6 is a cross sectional view of an embodiment of a wound, multi-layer electrochemical battery/capacitor made according to the present invention.

A device according to the present invention could also be provided in a wound configuration as indicated in FIG. 6. FIG. 6 shows in cross section a wound device 251 which includes a metal case 255 which acts as the positive terminal of the device 251. The case 255 includes an outer shell 256 and a cover 257. The cover 257 includes a feedthrough 258 which is attached to the cover 257 by an insulative seal 259 and which supplies the negative terminal for the device 251. The winding includes sheeted layers of insulating material 260, anode current collector 262, anode layer 264, polymeric electrolyte layer 266, cathode layer 268, and cathode current collector 270. As in the cell shown in FIG. 3, the anode layer 264 includes both the primary Faradaic component and the capacitor component from the combination of particulate active metal anode, conductive carbon and electrolyte. Likewise, the cathode layer 268 of each cell includes cathode material, conductive carbon and electrolyte. The cathode current collector 270 of the winding extends from the winding to provide electrical contact with the shell 256 and the cover 257. The winding preferably includes a mandrel 275 of insulating material onto which the layers 260–270 are wound. A lead 280 forms the connection between the feedthrough 258 and the anode current collector 262.

The thickness of the formed electrode can be critical to many applications due to the rate at which the stored charge can be removed from the device. The thickness can affect the capacitance, energy density and discharge response time of the device. For example, a device could be made to have the discharge response times set forth in Table 1 by providing electrodes of approximately the given thickness.

TABLE 1

| Response Time(s) | Nominal Electrode thickness (μm) |
|---|---|
| 100 | 500 |
| 10 | 100 |
| 1 | 50 |
| .1 | 10 |
| .01 | 5 |

TABLE 1-continued

| Response Time(s) | Nominal Electrode thickness (μm) |
|---|---|
| .001 | 1 |

Preferably, therefore, the thickness of the electrode is less than about 10 μm for many electronics applications and most preferably less than about 5 μm for use in such devices as implantable cardiac defibrillators.

The following examples illustrate several embodiments of the present invention.

EXAMPLE 1

A gelled electrolyte material was made using 8% polyacrylonitrile, 40% propylene carbonate, 40% ethylene carbonate and 12% lithium triflate.

The solid lithium triflate and ethylene carbonate were dissolved into the liquid propylene carbonate with heating and stirring to make a stock liquid electrolyte solution. The polyacrylonitrile was powdered to facilitate dissolution and was combined with the stock liquid electrolyte solution. With continuous stirring, the material was heated to a temperature of 80°–140° C. The polyacrylonitrile dissolved abruptly, resulting in a highly viscous melt. Stirring was continued to ensure homogeneity. The melt was transferred to a vacuum oven held at a nominal 140° C. and was evacuated to withdraw any volatile impurities and gas bubbles. The material was then cooled to room temperature where it solidified into a rubbery, solid mass.

EXAMPLE 2

The gelled electrolyte composition of Example 1 was melted and cast into a film. The composition was remelted and while hot was pressed between two flat, parallel glass plates at a force of 20–60 pounds. Shims and/or masking materials were used to control the thickness of the pressed material. When cooled to room temperature, the material was in the form of transparent sheets between 50–1000 μm thick. It was readily removed from the press. In order to remove excess liquid electrolyte from the pressed film, the film was stacked with alternating layers of paper towels and a pressing weight was applied to the stack for one half hour to 24 hours.

EXAMPLE 3

Electrodes were made from various carbons and the gelled electrolyte composition from Example 1.

Carbon samples were dried at 210° C. for 160 h and were thereafter maintained in a dry room. The carbon was then mixed in the desired proportions with the gelled electrolyte composition from Example 1 and was heated with stirring at about 120°–150° C. The hot mix was transferred to a vacuum oven at about 120°–150° C. and a vacuum was carefully applied to remove entrapped gasses and volatile impurities. The vacuum was maintained for about 30 minutes. Samples of the degassed material were poured while hot onto molds, flat metal sheets, plastic sheets or flat glass plates as desired and were pressed with a platen to reduce thickness as set forth in Example 2.

EXAMPLE 4

Electrodes were made from various carbons and the gelled electrolyte composition from Example 1 and the stock liquid electrolyte from Example 1.

Carbon samples were dried at 210° C. for 160 h and were thereafter maintained in a dry room. The carbon was then mixed in with the stock liquid electrolyte from Example 1 until the carbon appeared to be a "slightly moist" mix. A desired amount of the gelled electrolyte material from Example 1 was then melted at about 140° C. and the mixture of carbon and liquid electrolyte was added slowly with mixing until a desired consistency was achieved. Representative electrode compositions are set forth in Table 2. The mixture was transferred to a vacuum oven at about 120°–150° C. and a vacuum was applied for about 30 minutes. Samples were poured while hot onto a glass plate preheated to about 140° C. and were pressed by a second glass plate into films of about 50 μm thick.

TABLE 2

| Carbon | Liquid Electrolyte | Gelled electrolyte |
|---|---|---|
| 5 g. Activated Carbon | 10.13 g | 25.5 g. |
| 5 g. Carbon Fibers | 6.03 g. | 15.5 g. |
| 1.54 g. Acetylene Black | 10.77 g. | 12.1 g. |
| 2.8 g. Carbon Black | 25.5 g. | 22 g. |

EXAMPLE 5

Electrodes were made by combining carbons with different properties.

0.25 g. carbon black was added to 3.0 g. of the liquid electrolyte from Example 1, 0.85 g. activated carbon and 0.9 g. liquid electrolyte were added to the mixture. 0.5 g. of polyacrylonitrile was stirred into 3.1 g of the liquid electrolyte from Example 1 while heating to 100°–140° C. to obtain a thick, viscous solution. The carbon black and liquid electrolyte were combined with the polyacrylonitrile and liquid electrolyte slowly, with mixing. About 1 g. of additional liquid electrolyte was added to reduce the viscosity of the mixture. The mixture was then degassed as in Example 4 and cast into a film.

EXAMPLES 6–8

Figure 7:
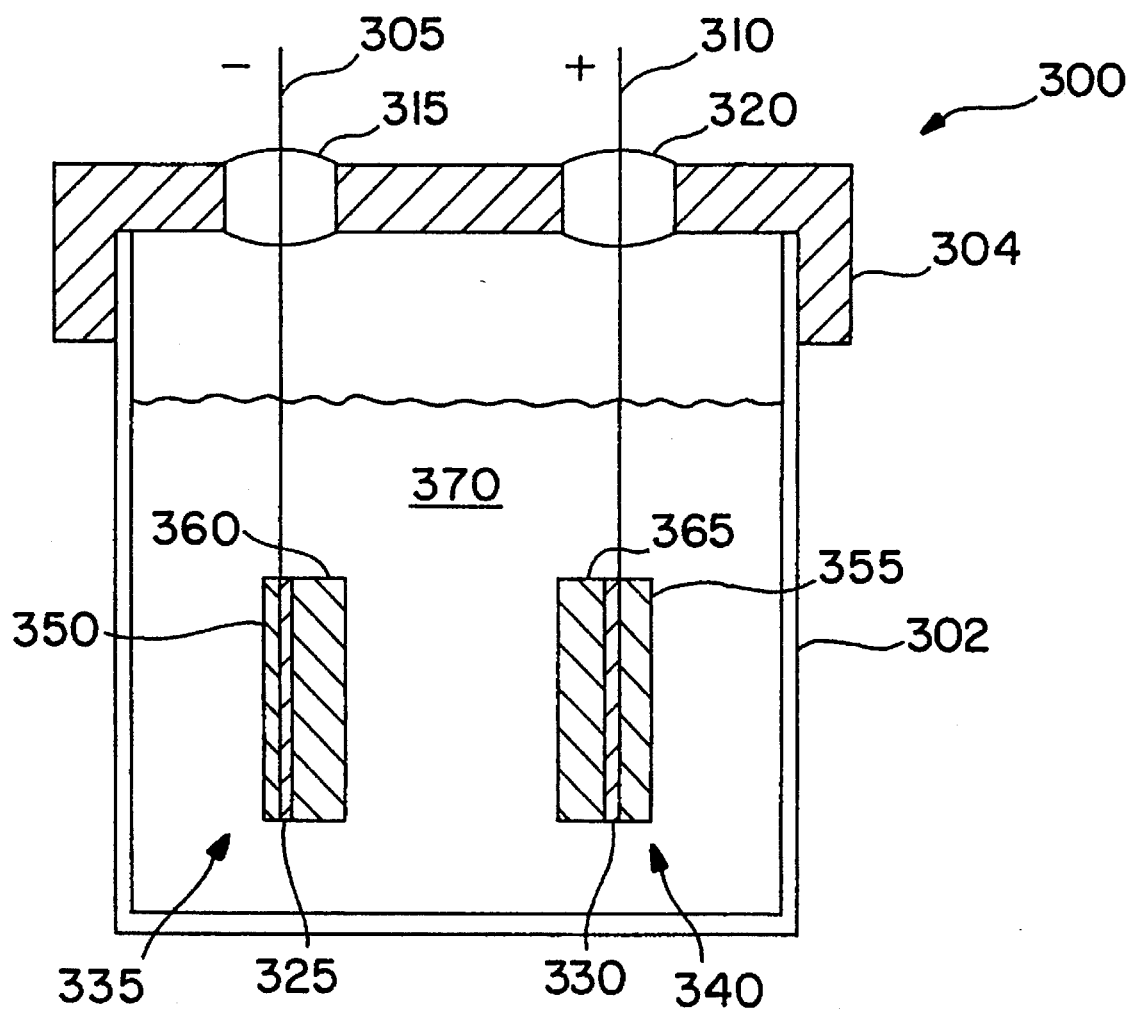
FIG. 7 is a cross sectional view of a test cell showing an embodiment of the present invention.

Comparative test cells were made in three configurations substantially as shown in FIG. 7. The test cell 300 included a jar 302 and a cover 304 in sealing engagement with the jar 302. Negative and positive leads 305, 310 of 316L stainless steel projected through seals 315, 320 and extend to electrical contact with 304L stainless steel screens 325, 330 for each electrode 335, 340. The electrodes were 0.5 inches in diameter. The materials used at each electrode 335, 340 varied according to the desired configuration. In a first test cell (Example 6), a lithium foil 350 was applied to the screen 325 and a cathode material (including 91.8% $MnO_2$, 5% PTFE powder and 3.2% Shawinigan black conductive carbon weighing 1.2 grams) was applied to the screen 330. In a second test cell (Example 7), carbon electrodes 360, 365 (including 79% Shawinigan black conductive carbon and 21% PTFE powder weighing 0.2 grams) were applied to both screens 325, 330 while the lithium foil 350 and cathode material 355 were omitted. In a third test cell (Example 8) a carbon electrode 360 and lithium foil 350 were applied to screen 325 and a carbon electrode 365 and cathode material 355 were applied to screen 330. Thus, the device of Example 8 represents the present invention while the devices of Examples 6 and 7 represent purely Faradaic and capacitive cells respectively. In all three examples, a liquid electrolyte

370 (a mixture of 60% propylene carbonate and 40% diglyme as solvent with dissolved 1.0 M $LiClO_4$ salt) occupied the jar 302 and covered the electrodes 335, 340.

Figure 8:
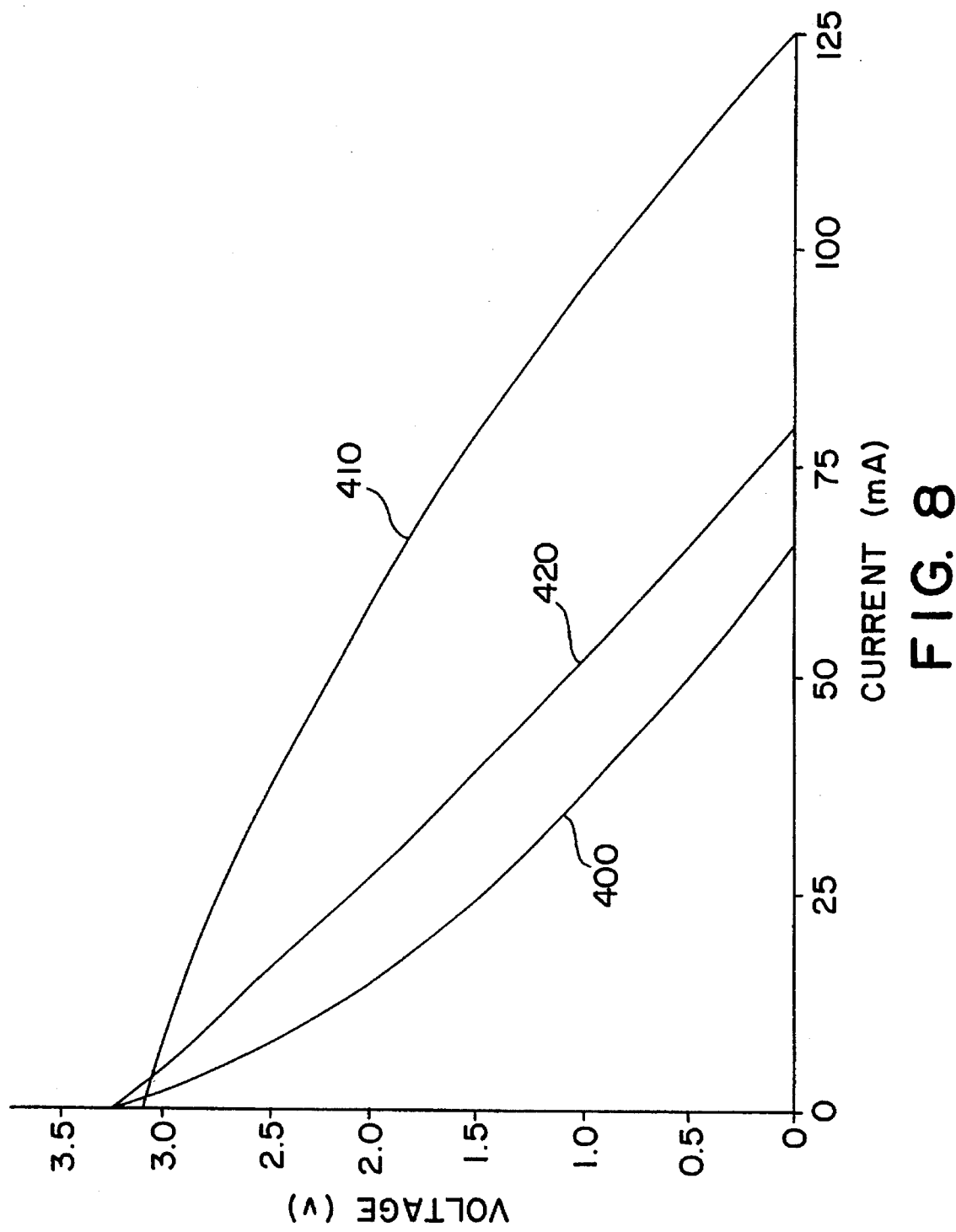
FIG. 8 is a graph comparing the discharge characteristics of a device made according to the present invention with devices having only capacitive and Faradaic operation.

The devices of Examples 6 and 8 were found to have normal open circuit voltages of about 3.4 v. The open circuit voltage of the device of Example 7 was about 0.2 v. The devices of Examples 6 and 8 were connected in parallel with the device of Example 7 in order to charge that device. After charging for about ½ hour, load curves were measured for the three devices as shown in FIG. 8. As shown in FIG. 8, the curve 400 for the Faradaic device of Example 6 shows the poorest current delivery capacity whereas the Example 7 capacitor device curve 410 shows the best high current delivery. The hybrid device of Example 8 shows in curve 420 an intermediate level of performance. Following the discharge, the device of Example 6 returned to its starting voltage with a measured voltage of about 3.2 volts; the device of example 7 recovered to a voltage of about 2.0 volts; and the device of Example 8 returned to a voltage of about 3.2 volts.

Figure 9A:
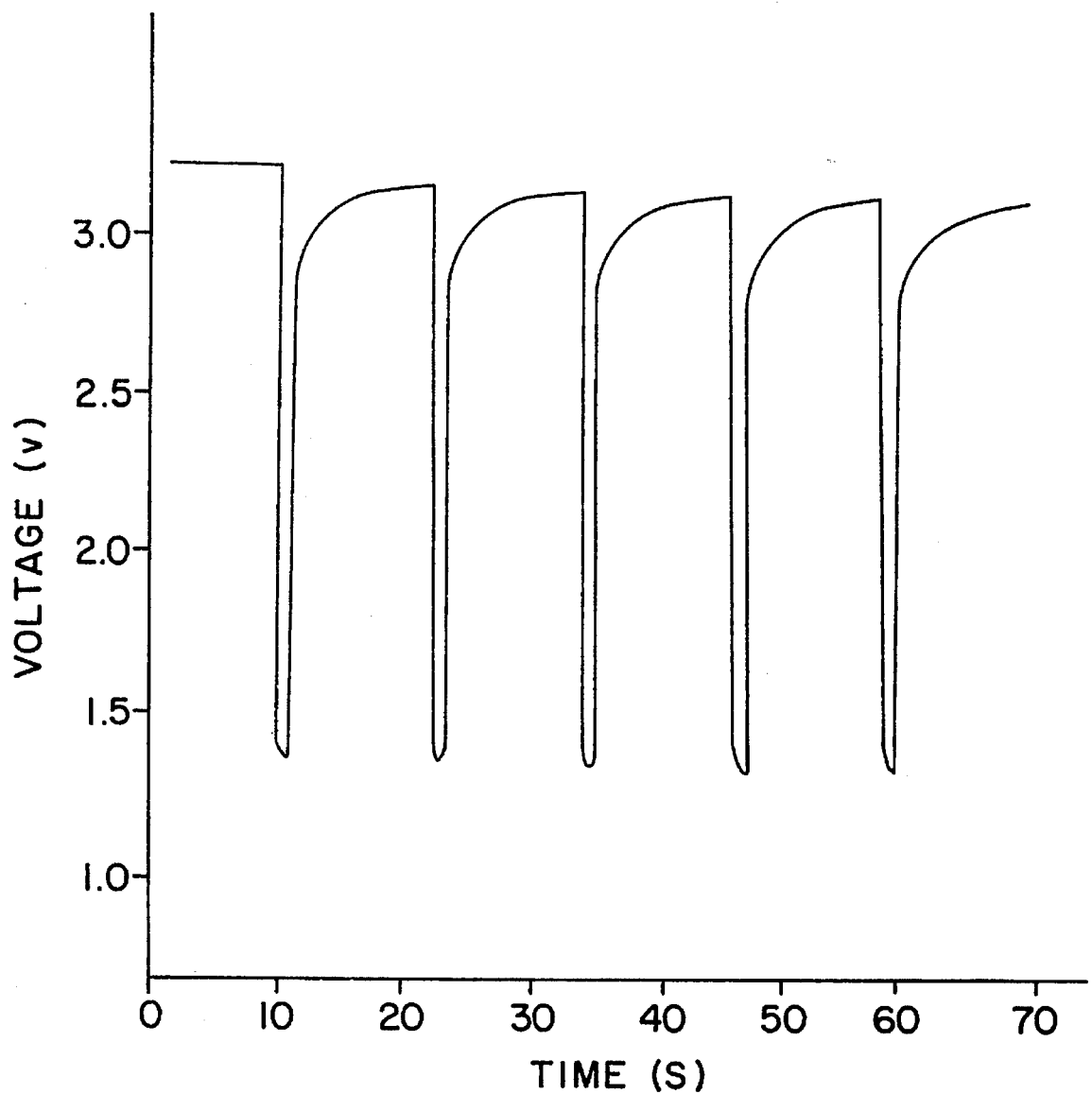
FIGS. 9(a) to 9(c) are graphs comparing the pulse discharge characteristics of a device made according to the present invention (FIG. 9(c)) with the pulse discharge characteristics of purely Faradaic (FIG. 9(a)) and capacitive (FIG. 9(b)) devices.
Figure 9B:
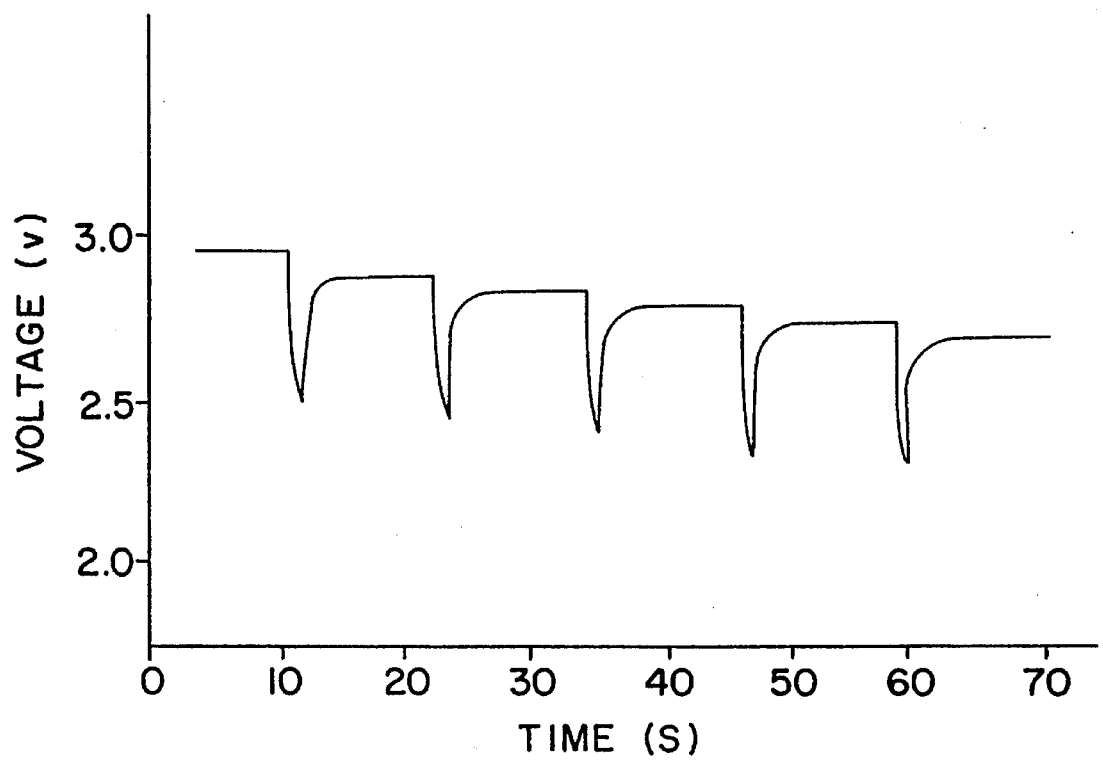
Figure 9C:
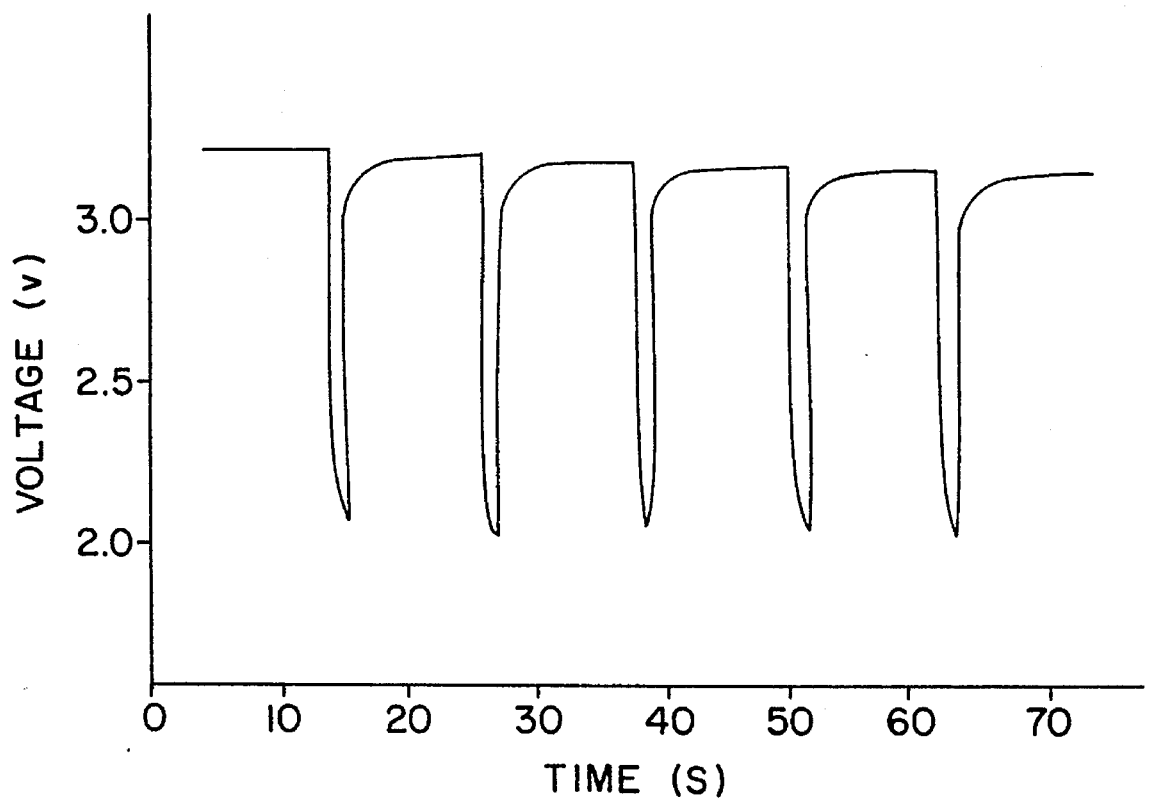

The device of Example 7 was recharged to about 3 volts and all three devices were subjected to pulse discharge of 25 mA for one second followed by an open circuit recovery time of 11 seconds corresponding to an 8% duty cycle. Curves for this discharge of Examples 6, 7 and 8 are shown in FIGS. 9(*a*), 9(*b*) and 9(*c*) respectively. The hybrid device (FIG. 9(*c*)) was shown to be able to achieve improved levels of pulsed power and pulsed energy with respect to the Faradaic cell (FIG. 9(*a*)) and the ability to self-charge to the initial open circuit voltage during pulsed discharge loads is unlike that of the capacitor device (FIG. 9(*b*)).

It will be appreciated by those skilled in the art that while the invention has been described above in connection with particular embodiments and examples, the invention is not necessarily so limited and that numerous other embodiments, examples, uses, modifications and departures from the embodiments, examples and uses may be made without departing from the inventive concepts.

We claim:

1. A method for making an electrochemical device comprising the steps of:
    (a) admixing electrically conductive carbon with a non-aqueous liquid solvent, a powdered active metal anode material, a soluble salt, and a gel-former;
    (b) sheeting the anode mixture into a thin electrode layer;
    (c) applying to a first side of the first electrode layer a metal current collector;
    (d) applying to a second side of the first electrode a first side of an electrolyte layer;
    (e) admixing an electrically conductive carbon with a non-aqueous liquid solvent, a powdered active cathode material, a soluble salt and a gel-former;
    (f) sheeting the cathode mixture into a second electrode layer; and
    (g) applying the second electrode layer onto a second side of the electrolyte layer.

2. A method according to claim 1 wherein conductive carbon comprises at least 10 wt % of the first and second electrode layers.

3. A method according to claim 1 wherein the solvent is selected from the group consisting: of ethylene carbonate, propylene carbonate, 2-methyl tetrahydrofuran, sulfolane, triglyme and mixtures thereof.

4. A method according to claim 1 wherein the soluble salt is selected from the group consisting of $LiClO_4$, $LiAsF_6$, $LiPF_6$, $LiCF_6SO_3$, $LiN(CF_3SO_2)_2$ and $LiBF_4$.

5. A method according to claim 2 wherein the gel-former is selected from the group consisting of polyacrylonitrile, polyvinylpryrrolidone, polytetraethylene glycol diacrylate, and mixtures thereof.

* * * * *